US012150162B2

(12) United States Patent
Qi et al.

(10) Patent No.: US 12,150,162 B2
(45) Date of Patent: Nov. 19, 2024

(54) RESOURCE ALLOCATION IN WIRELESS NETWORK

(71) Applicant: ZTE Corporation, Guangdong (CN)

(72) Inventors: Tao Qi, Guangdong (CN); Wei Luo, Guangdong (CN); Lin Chen, Guangdong (CN); Boyuan Zhang, Guangdong (CN); Feng Xie, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 336 days.

(21) Appl. No.: 17/738,844

(22) Filed: May 6, 2022

(65) Prior Publication Data

US 2022/0263610 A1   Aug. 18, 2022

Related U.S. Application Data

(63) Continuation of application No. PCT/CN2019/116325, filed on Nov. 7, 2019.

(51) Int. Cl.
*H04L 5/00* (2006.01)
*H04L 1/1812* (2023.01)
*H04L 1/1867* (2023.01)
*H04W 72/0446* (2023.01)
*H04W 72/20* (2023.01)
(Continued)

(52) U.S. Cl.
CPC ........... *H04W 72/56* (2023.01); *H04L 1/1812* (2013.01); *H04L 1/1887* (2013.01); *H04L 5/0055* (2013.01); *H04W 72/0446* (2013.01); *H04W 72/20* (2023.01); *H04W 72/23* (2023.01);
(Continued)

(58) Field of Classification Search
CPC . H04W 72/56; H04W 72/0446; H04W 72/20; H04W 72/23; H04W 72/542; H04W 72/569; H04L 1/1812; H04L 1/1887; H04L 1/1822; H04L 5/0055
See application file for complete search history.

(56) References Cited

U.S. PATENT DOCUMENTS

2018/0077552 A1   3/2018 Lee et al.
2018/0310308 A1*  10/2018 Loehr .................. H04W 72/56
(Continued)

FOREIGN PATENT DOCUMENTS

WO   2018/128568 A1   7/2018

OTHER PUBLICATIONS

Intel Corporation; "3GPP TSG RAN WGl Meeting #97 R1-1907888" *Summmy #3 for AI 7.2.4.2.2 Mode-2 Resource Allocation*, May 17, 2019; 28 pages.
(Continued)

*Primary Examiner* — Jamal Javaid
(74) *Attorney, Agent, or Firm* — Crowell & Moring LLP

(57) ABSTRACT

Methods for resource allocation and provisioning in a wireless user equipment for sidelink communication with another wireless user equipment are disclosed. For example, a preemption procedure is implemented for allocating active Hybrid Automatic Repeat reQuest (HARQ) processes in a MAC layer of the wireless user equipment to efficient transmit or receive transport blocks. The preemption procedure may be based on preemption status parameters and preemption priority parameters associated with various transport blocks competing for the HARQ process resources.

20 Claims, 3 Drawing Sheets

(51) Int. Cl.
H04W 72/23 (2023.01)
H04W 72/542 (2023.01)
H04W 72/543 (2023.01)
H04W 72/56 (2023.01)
H04W 72/566 (2023.01)

(52) U.S. Cl.
CPC ....... H04W 72/542 (2023.01); H04W 72/543 (2023.01); H04W 72/569 (2023.01)

(56) References Cited

U.S. PATENT DOCUMENTS

2019/0215897 A1  11/2019  Babaei et al.
2020/0267753 A1* 8/2020  Adjakple .............. H04W 72/54

OTHER PUBLICATIONS

Intel Corporation; "3GPP TSG RAN WG1 Meeting #98bis R1-1910650" *Resource Allocation Mode-2 for NR V2X Sidelink Communication*; Oct. 20, 2019; 28 Pages.
Ericsson; "3GPP TSG-RAN WG1 Meeting #97 R1-1907136" Resource allocation for Mode-2 transmissions; May 17, 2019; 18 pages.
International Search Report mailed Aug. 5, 2020 for International Application No. PCT/CN2019/116325.
Written Opinion mailed Aug. 5, 2020 for International Application No. PCT/CN2019/116325.
ASUSTeK; "Discussion on handling multiple SL communication"; 3GPP TSG-RAN WG2 Meeting #107bis, Chongqing, China, Oct. 14-18, 2019; R2-1913768; 6 pages.
Sequans Communications; "Handling of collisions with a CG"; 3GPP TSG-RAN WG2 Meeting #107bis, Chongqing, China, Oct. 14-18, 2019; R2-1913624; 4 pages.
Extended European Search Report dated Oct. 18, 2022 for European Application No. 19951577.6.
First Examination Report dispatched Oct. 20, 2022 for Indian Application No. 202217026162.
Japanese Office Action with English translation, dated Apr. 10, 2023, pp. 1-5, issued in Japanese Patent Application No. 2022-526113, Japanese Patent Office, Tokyo, Japan.
CAICT, "Considerations on the resource allocation for NR sidelink Mode2," dated Oct. 7, 2019, pp. 1-7, Agenda Item 72.4.22, 3 GPP TSG RAN WG1 #98bis, R1-1911323, Chongqing, China, Oct. 14-19, 2019.
Lenovo, Motorola Mobility, "SL HARQ protocol operation," dated October 3, 2019, pp. 1-8, 3GPP TSG RAN WG2 #107bis R2-1912686, Chongqing, China, Oct. 14-19, 2019.

* cited by examiner

RESOURCE ALLOCATION IN WIRELESS NETWORK

CROSS REFERENCE

This application is a continuation of and claims priority to International Patent Application No. PCT/CN2019/116325, filed Nov. 7, 2019, which is herein incorporated by reference in its entirety.

TECHNICAL FIELD

This disclosure is generally directed to resource allocation in wireless networks.

BACKGROUND

User equipments in a wireless network may communicate data with one another via direct sidelink communication channels without the data being relayed by any wireless access network nodes. Some application scenarios of sidelink communications such as those involving vehicular wireless network devices, may have communication requirements that are more stringent and unpredictable compared to other conventional applications involving UE-UE sidelink communications. It is critical to provide a resource allocation and provisioning mechanism to enable efficient use of both sidelink communication resources and other hardware/software resources in various layers, such as a MAC layer, of the sidelink communication protocol stack of the UE.

SUMMARY

This disclosure relates to methods, systems, and devices for allocating and provisioning wireless communication resources for transmitting and receiving data between UEs in a wireless network via direct sidelink communication channels.

In one implementation, a method performed by a first wireless user equipment is disclosed. The method may include identifying a first transport block (TB) for transmission to a second wireless user equipment via a sidelink; determining a preamptable active hybrid automatic repeat request (HARQ) process among a plurality of active HARQ processes in a media access control (MAC) layer of the first wireless user equipment using an HARQ process preemption procedure based on a preemption status parameter and a preemption priority parameter associated with the first TB; associating the first TB with the preemptable active HARQ process; and transmitting, and retransmitting the first TB if needed, to the second wireless user equipment via the associated active HARQ process via the sidelink.

In another implementation, a method performed by a first wireless user equipment is disclosed. The method may include determining communication session ID for receiving a first transport block (TB) from a second wireless user equipment via a sidelink; monitoring a sidelink control information (SCI) via a physical sidelink control channel (PSCCH) with matching communication session ID; determining a preamptable active hybrid automatic repeat request (HARQ) process among a plurality of active HARQ processes in a media access control (MAC) layer of the first wireless user equipment using an HARQ process preemption procedure based on a preemption status parameter and a preemption priority parameter associated with the first TB; associating the first TB with the preemptable active HARQ process; and receiving the first TB from the second wireless user equipment according to the preemptable active HARQ process via the sidelink.

In another implementation, a method for resource allocation for groupcast in a wireless network is disclosed. The method may include mapping quality of service (QoS) flows to plurality of logic channels (LCHs)/radio bearers (RBs), wherein the LCHs/RBs are associated with corresponding first reliability indicators and wherein each of the first reliability indicators comprises one of feedback disabled, feedback NACK only, and feedback with both ACK and NACK in ascending reliability order; performing a logic channel prioritization (LCP) procedure based on the first reliability indicators; generating transport blocks (TBs) from the LCP procedure; and deriving second reliability indicators each for one of the TBs.

In yet another implementation, a method for resource allocation for groupcast in a wireless network is disclosed. The method may include mapping QoS flow to a plurality of logic channel (LCHs)/radio bearers (RBs), wherein the LCHs/RBs are associated with a first HARQ feedback indicator comprising one of HARQ feedback enabled and HARQ feedback disabled; performing a logic channel prioritization (LCP) procedure based on the first HARQ feedback indicators; generating transport blocks (TBs) from the LCP procedure; and determining second HARQ feedback indicators each for one of the TBs.

In some implementations, a wireless user equipment comprising one or more processors and one or more memories are disclosed. The one or more processors may be configured to read computer code from the one or more memories to implement a method in any one of the implementations above.

In some other implementations, a computer program product comprising a non-transitory computer-readable program medium with computer code stored thereupon is disclosed. The computer code, when executed by one or more processors, may cause the one or more processors to perform of any one of the implementations above.

The above embodiments and other aspects and alternatives of their implementations are explained in greater detail in the drawings, the descriptions, and the claims below.

DETAILED DESCRIPTION

Figure 1:
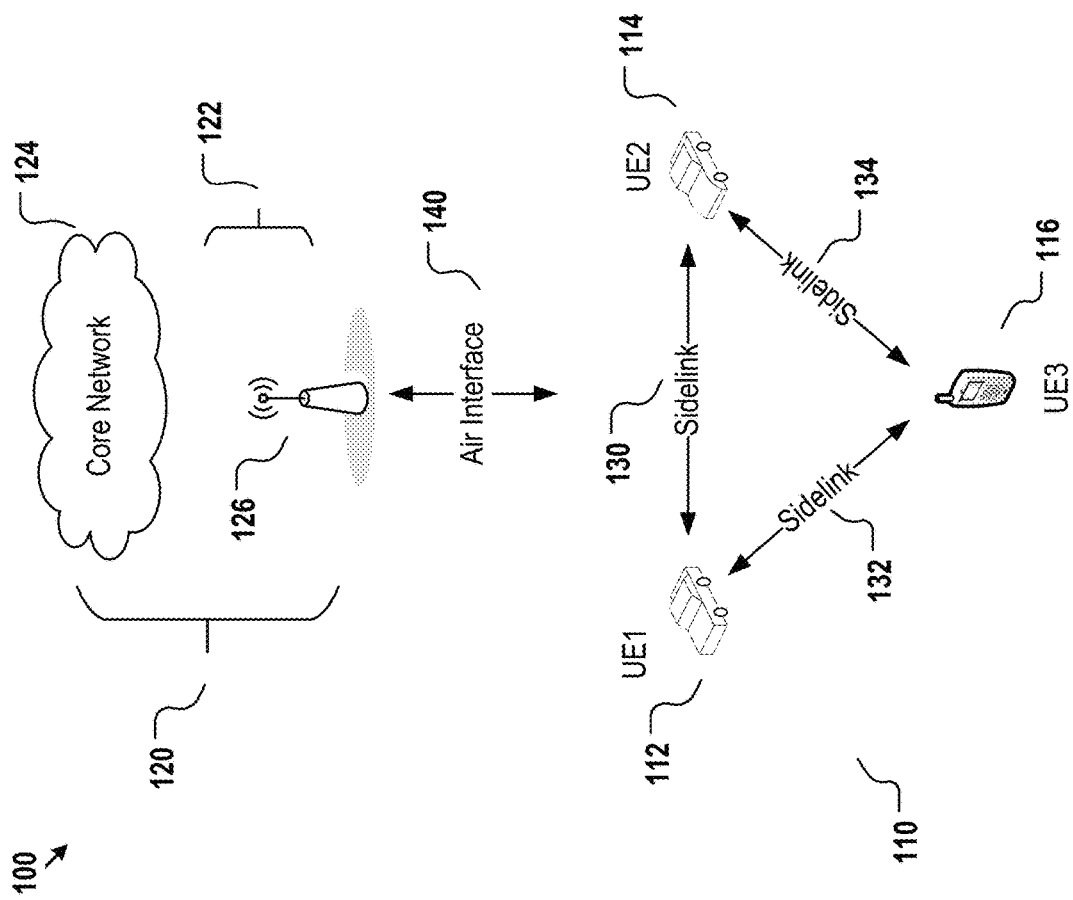
FIG. 1 illustrates an exemplary wireless network supporting sidelink communication between UEs.

As shown in FIG. 1, a wireless communication network 100 may include user equipments (UEs) 110 and a carrier network 120. The carrier network 120, for example, may further include wireless access networks 122 and a core network 124. The wireless access networks 122 may include wireless base stations or wireless access network nodes, such as 126 (only one node is shown for simplicity). The wireless access network nodes 126 may be backhauled to the core network 124. The UEs 110 may communicate with the carrier network 120 via the wireless access networks 122 using air interface 140. The carrier network 120 may be configured to transmit and route voice, data, and other information among the UEs 110, and between the UEs 110 and other data networks or other carrier networks terminated at the input edges of the core network 124. The UEs 110 may be further configured to communicate directly with one another via over-the-air sidelinks. For example, as shown in FIG. 1, UE 112 may directly communicate with UE 114 via sidelink 130, UE 112 may directly communicate with UE 116 via sidelink 132, and UE 114 may directly communicate with UE 116 via sidelink 134. Such direct communication of data via the sidelinks between the UEs do not need any data relay from the wireless access network nodes 126.

The UEs 110 may include both mobile and fixed network devices of various types for various applications. For example, the UEs 110 may include but are not limited to mobile phones, tablets, personal digital assistants, laptop computers, desktop computers, Internet-of-Things (IoT) devices, distributed sensors, and vehicular network devices. A vehicular network device, in particular, may be installed as an integral part or as an accessary device in a vehicle. As such, vehicles may be interconnected with each other or with other network devices via direct sidelinks 130, 132, and 134, and/or indirectly via the carrier network 120 through the air interface 140. Hereinafter, a vehicular device may be referred to as a vehicle for simplicity.

The term V2X may be used to refer to information exchange between a vehicle and another network device X according to a set of V2X communication protocol and specification. The network device X may be another vehicle, a pedestrian UE, a roadside unit UE, or a particular destination in the Internet (e.g., a data network terminated at the edge of the core network 124). Correspondingly, V2X can be classified into a few categories, including but not limited to Vehicle-to-Vehicle (V2V), Vehicle-to-Pedestrian (V2P), Vehicle-to-Infrastructure (V2I), and Vehicle-to-Network (V2N). V2X, for example, provides more efficient communication for supplying entertainment content to vehicles and for improving vehicle safety.

V2X protocols may be used to enable various advanced application scenarios with communication requirements higher than conventional applications based on sidelink communications. These more advanced V2X application scenarios may include but are not limited to application categories such as vehicle platooning, extended sensors sharing, semi-autonomous or full-autonomous driving, and remote driving. Data transmission requirements may depend on specific data services needed for these applications. The V2X applications may require, for example, packet data sizes between 50 to 12000 bytes, message transmission rates between 2 to 50 messages per second, maximum end-to-end transmission delays of less than 3 to 500 ms, data transmission reliability of 90% to 99.999%, data transmission rate between 0.5 to 1000 Mbps, and communication ranges of 50 to 1000 m. These requirements may be disparate between different data services.

In addition, the V2X protocols may need to support co-existence of various distinct communication cast types including broadcast as well as unicast and groupcast (or multicast). Further, a single UE may support simultaneously transmitting or receiving up to a predetermined maximum number of unicast, multicast, or broadcast sidelink communication sessions. For example, a single UE may simultaneously support up to 32 unicast, multicast, or broadcast sidelink communication sessions. A V2X sidelink communication session may further support multiple Quality of Service (QoS) flows with distinct QoS profiles and characteristics, and with various levels of QoS granularity. The V2X protocols may further be designed to support up to a predetermined maximum number of data retransmission based on a Hybrid Automatic Repeat reQuest (HARQ) mechanism. For example, the predetermined maximum number of retransmission may be set at 32. As a result of the dynamic retransmission scheme, a transmission time period for a single transmission data block may become uncertain and unpredictable in V2X applications.

As such, the V2X communication via UE sidelinks for the application scenarios above may require improved resource allocation/management/utilization mechanisms not only for the sidelink communication resources but also for the resources within the UE software/hardware, such the HARQ process resources in the MAC layer of the UE for provisioning data transmission and retransmission.

As to the sidelink communication resources, there may be two types of sidelink resource allocation mode, Mode 1 and Mode 2. In Model, the wireless access network node may schedule the sidelink resources to be used by UE for sidelink communication, whereas in Mode 2, the UE rather than the wireless access network node determines the sidelink transmission resources within sidelink resources configured by the wireless access network node or within pre-configured sidelink resources. A data transmitting UE may operate in either modes, or both modes which may be referred to as mode co-existence.

With respect to the HARQ process resources, they are provided by the MAC layer and may be limited due to the potentially large number of sidelink communication sessions that may need to be simultaneously supported by the UE. Thus, the HARQ process resources may need to be shared among different services under a sharing mechanism to improve data communication performance and reliability, and to reduce transmission latency for services requiring high levels of performance and reliability.

The implementations below provide examples for sharing HARQ process resources in the MAC layer of a UE by different data services based on an exemplary preemption mechanism. Because the functioning of the preemption mechanism in a particular UE may depend on information from other UEs and the carrier network, it may not be completely left to the particular UE as design choices. Specification of the parameters and other aspects of the communication as part of a sidelink standard for purposes of interoperability between UEs may be needed.

While the implementations disclosed below are motivated by the application scenarios related V2X, the underlying principles apply to any other UE-to-UE sidelink communication resource management for any types of UEs and applications unlimited to V2X. Further, while these implementations relate particularly to sharing and preemption of HARQ resources in the MAC layer of a UE, the underlying principle may be applied to provisioning of other MAC resources, or hardware/software resources related to other layers in the communication stack.

Figure 2:
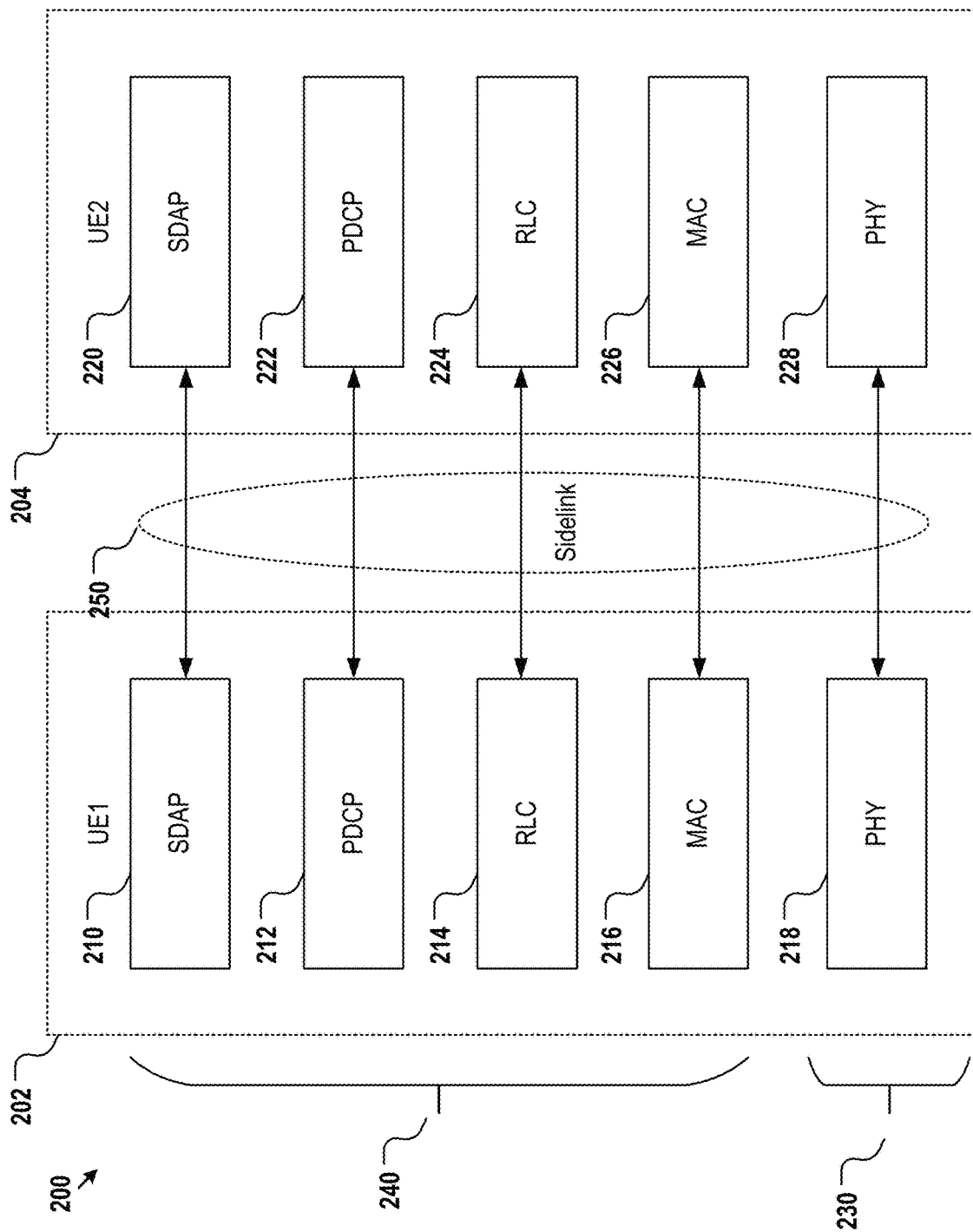
FIG. 2 illustrates an exemplary protocol stack structure involved in UE-UE sidelink communications.

FIG. 2 shows an example communication protocol stack structure 200 involved in sidelink communication between UE 202 and UE 204. The communication protocol stacks may include layer 230 and layer 240. Layer 230 may be alternatively referred to as layer-1, including for example a physical layer 218 or 228. Layer 240 may be referred to as layer-2, including, for example, a MAC protocol 218 or 226, followed in sequence by a Radio Link Control (RLC) protocol 214 or 224, a Packet Data Convergence Protocol (PDCP) 212 or 222, and a Service Data Adaptation Protocol (SDAP) 210 or 220. During various stages of a sidelink communication between the UE 202 and UE 204, the various protocol entities above may communicate with each other via sidelink control or data channels as indicated by 250.

A sidelink communication session, being either a unicast, a multicast, or a broad cast session, once established by the higher protocol layers not shown in FIG. 2 (such as anon-Access Stratum (NAS) layer) may be handled by the SDAP entity. The sidle link communication sessions may include multiple QoS flows carrying service data having distinct QoS requirements. In FIG. 2, the SDAP entity may be responsible for performing QoS Flow handling. In particular, the SDAP entity may group and map the QoS flows to various allocated radio bearers. In the situation where the communication session comprises a multicast/broadcast session targeting a plurality of UEs, the SDAP entity may further duplicate a group of QoS flows to either map the group of flows to a radio bearer for unicast of the multicast/broadcast data to particular single UEs among the plurality of target UEs or mapping the group of QoS flows to another independent radio bearers for multicast/broadcast of the multicast/broadcast data to a subset of UEs among the plurality of target UEs. Such QoS flow handling was described in detail in the PCT International Patent Application No. PCT/CN2019/114627, belonging to the same Applicant as the current patent application and filed with the Chinese Patent Office on Oct. 31, 2019, the entirety of which is herein incorporated by reference.

The PDCP 212 or 222 may be responsible for header compression, ciphering, and preforming integrity protection of the data load in the radio bearers. The PDCP 212 or 222 may include independent PDCP entities each configured to handle each of the radio bearers. The RLC entity 214, for example, may be responsible for segmentation, reordering, duplicate detection, error detection and recovery of the data carried in the radio bearers to generate data transmission unit as logic channels.

The MAC entity 216 or 226 may be responsible for mapping the logic channels associated with the RCL entity 214 to physical radio resource blocks to generate Transport Blocks (TBs) that will be transmitted by the PHY layer 218 using the corresponding allocation of physical resource blocks.

The MAC entity 216 or 226 may further be responsible for managing the transmission and retransmission of the TBs. Retransmission of a TB may be needed when the prior attempted transmission of the TB fails or otherwise unacknowledged. The management of the transmission and retransmission of the TBs may be handled by a HARQ entity within the MAC entity. The HARQ entity may include a plurality of HARQ processes as MAC hardware/software resources that may be individually allocated to each of the TBs for transmission and retransmission management according the HARQ specification. Each of the HARQ process may only be associated with and capable of assisting one TB at a time. The number of HARQ processes configured within the HARQ entity may not be unlimited. For example, the number of HARQ processes in the HARQ entity may be predetermined. In other words, there may be more TBs that requests transmission/reception than the number of HARQ processes. In such situations, the HARQ processes may need to be efficiently shared by the TBs.

Figure 3:
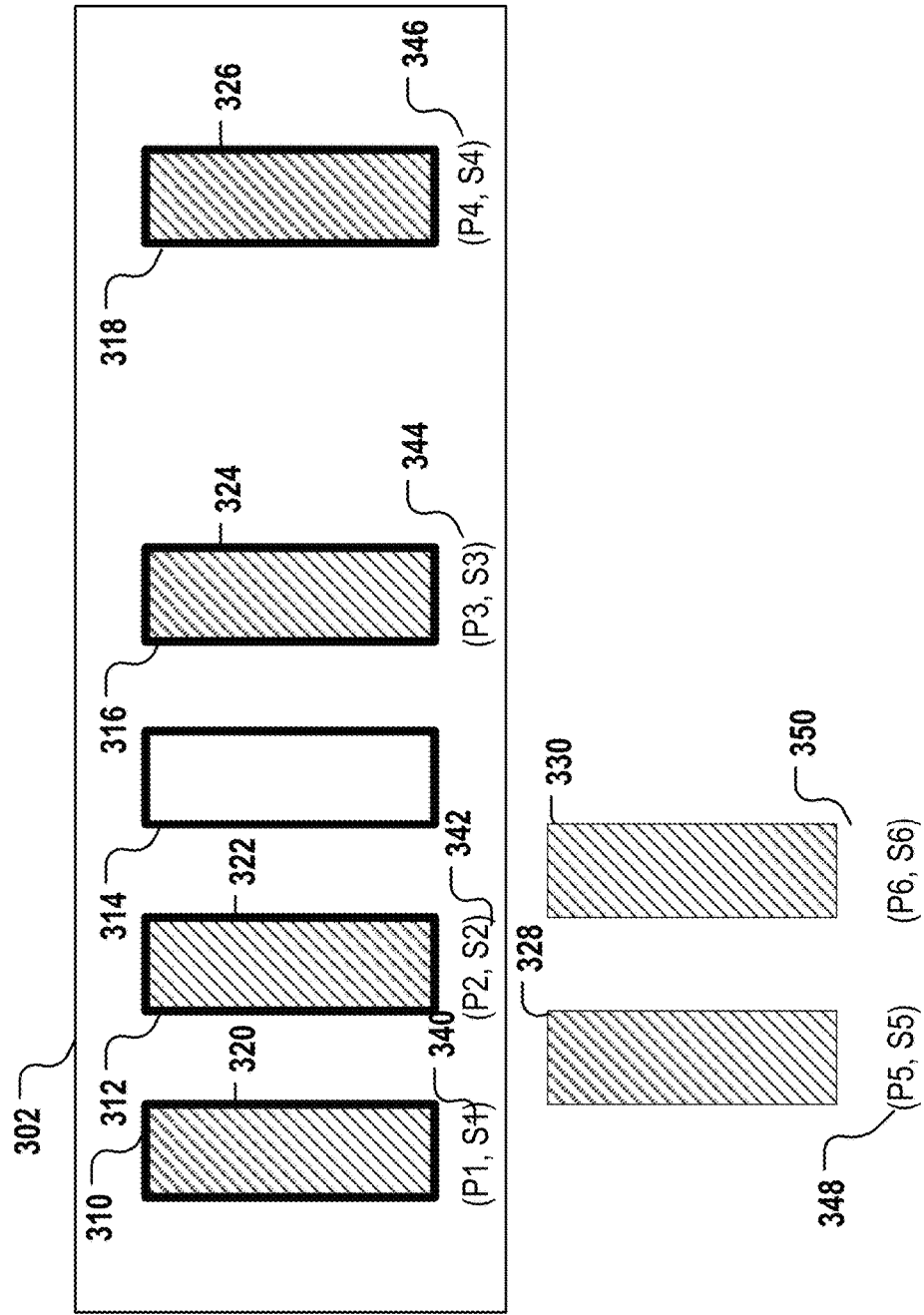
FIG. 3 illustrates an exemplary HARQ resource allocation and preemption mechanism.

In some implementations, the HARQ processes may be shared based on a method similar to a resource pre-emption mechanism. This mechanism is illustrated in FIG. 3. FIG. 3 is applicable to both transmitting UEs and receiving UEs. In particular, FIG. 3 shows the HARQ entity 302 and the HARQ processes 310, 312, 314, 316, and 318 (as the black frames). FIG. 3 further shows a snapshot of HARQ process allocation or association for a plurality of TBs needing transmission or receiving at a particular instant of time. In FIG. 3, each shading with dashed lines corresponds to a TB. For example, HARQ process 310 is allocated to TB 320, HARQ process 312 is allocated to TB 322, HARQ process 316 is allocated to TB 324, and HARQ process 318 is allocated to TB 326. FIG. 3 shows one HARQ process 314 that is free and available for allocation. FIG. 3 further shows that two new TBs, TB 328 and TB 330, are queued for transmission and have not been allocated with any HARQ process. There are possible TBs for receiving not shown in FIG. 3. The HARQ processes for transmitting and receiving TBs may be independently configured. For example, there may a predetermined number of transmitting HARQ process available in the MAC entity for transmitting/retransmitting TB s, and likewise, there may be an independently predetermined number of receiving HARQ process available in the MAC entity for receiving/re-receiving TBs.

An exemplary preemption mechanism may be implemented as follows. The MAC entity may assign all TBs which either has been associated with an HARQ process or has not be associated with an HARQ process a preemption status and a preemption priority. The preemption status for TB with index j may be denoted by $S_j$. The preemption priority for TB with index j may be denoted as $P_j$. The MAC entity may perform an allocation and preemption procedure based on the pre-emption state $S_j$ and the pre-emption priority $P_j$ of all the TBs, either allocated or unallocated with an HARQ process. In FIG. 3, each of the TBs 320, 322, 324, 326, 328, and 330 is associated with a ($P_j$, $S_j$) pair, as indicated by 340, 342, 344, 346, 348, and 350.

In some implementations, a TB already associated with a HARQ process may either continue its association with the HARQ process to continue transmitting/retransmitting or receiving/re-receiving data, or the associated HARQ process may be preempted by another TB and the TB may be forced to release its association with the HARQ process. The buffer related to the HARQ process may be flushed, and the TB then lose its current transmitting/retransmitting or receiving/re-receiving opportunity. An unallocated TB that is not currently associated with a HARQ process may be allocated to a HARQ process that is currently available. If there is no HARQ process available, the MAC, depending on the preemption status and preemption priority information, may execute the preemption procedure to potentially preempt the HARQ process associated to another TB currently to force the other TB to release the HARQ process and allocated the released HARQ process to the unallocated TB to gain an opportunity to transmitting or receiving data. For a transmitting UE, if the preemption fails, the service data in the unallocated TB is either re-assembled in the LCP procedure for another grant or discarded. For a receiving UE, if the preemption fails, the service data is discarded, and will not be stored in any HARQ process. The term transmitting/retransmitting or receiving/re-receiving opportunity for a TB is used to indicate that the TB and the related HARQ information are to be associated with a HARQ process, that the TB is to be stored in the HARQ buffer of the HARQ process, and that the TB is to be transmitted/retransmitted or received/re-received in the sidelink resource grant managed by the HARQ process.

In the example shown in FIG. 3, because the HARQ process 314 is currently available, the MAC entity may allocate the HARQ process 314 to one of the queuing TB 328 or 330. In one implementation, the MAC entity may choose one of the TBs from the TB queue for allocation of the available HARQ process based on the preemption status and preemption priority of the queued TBs. After the allocation of the available HARQ process 314 to one of the TBs 328 and 330, the remaining TB many then participate in the preemption procedure. It may or may not preempt one of the HARQ process currently allocated TBs depending on the preemption statuses and preemption priorities of the various TBs.

As further described below, the preemption statuses and preemption priorities for the TBs may change over time, leading to a dynamic HARQ process allocation and preemption by the MAC entity at different times. For example, a high preemption priority TB that may not be preempted at one time may drop in priority at a later time and its associated HARQ process may be preempted at that later time by a queuing TB having higher preemption priority.

The determination of the pre-emption priority Pj associated to the TB may be based on various exemplary parameters which are either static or dynamic, including but not limited to:

Priority information in the Sidelink control information (SCI). The SCI may be carried in a Physical Sidelink Control Channel (PSCCH) and received by the MAC entity of a receiving UE. Such priority information may be determined by the transmitting UE based on the characteristics of the QoS flows included in the TB being transmitted.

a channel busy ratio (CBR) of a transmitting resource pool used by a transmitting UE associated with the TB;

a packet delay budget (PDB) associated with the TB;

a maximum retransmission number associated with the TB;

a ratio of the number of TBs that have already been transmitted by the first wireless user equipment compared to the maximum retransmission number allowed;

a time duration that the TB has been associated with an active HARQ process;

a number of code block groups (CBGs) that have been transmitted successfully for the TB;

a ratio of CBGs that have been transmitted successfully to a total number CBGs in the TB; or a resource reservation status (i.e., the number of successful reserved retransmission resource, or the time offset between current resource and the farthest reserved retransmission resource or both) indicated in the SCI which indicates the next or several next retransmission associated with the TB.

The preemption priority for a TB may be derived based on these parameters in weighted combination or in any other manners. In some implementations, a smaller priority number may indicate higher priority. For example, the preemption priority Pj can be mapped from the combination or a single value from above list, such as the priority information in the SCI and the CBR information. Mapping rule or mapping table can be configured by the network node, or based on a pre-configuration in the UE. Considering there are possibilities that multiple TBs may have the same Pj, it can be left up to UE implementation to determine which one of the multiple TB s to gain or lose the (re)receiving or (re)transmitting opportunity. Other factors or parameters can be used as tie breaker. For example, a TB of lower PDB value may be given higher priority when the Pj of the multiple TBs are the same.

A TB owns the higher preemption priority (lower Pj) can preempt the HARQ process associated with TBs which are of lower preemption priority (higher Pj). In another implementation, an offset may be considered in the preemption procedure. An offset may be added to the preemption priority of the TB that is to preempt the HARQ process, and the TB will participate in the preemption procedure with the new preemption priority. For example, without the offset, a TB1 of preemption priority of 5 can preempt the HARQ process associated with TBs of preemption priority of 7. However, with offset of 2, a TB of preemption priority of 5 is not able to preempt the HARQ process associated with TBs of preemption priority of 7, since preemption priority of TB1 and other TB are the same of 7 considering the offset. The offset value may be configured by the network or based on the pre-configuration. As shown by the list above, some parameters, such as the PDB, CBR information, maximum retransmission number, and the ratio of the number of TBs may have already been transmitted by the first wireless user equipment. In comparison, the maximum retransmission number allowed to be associated with the TB may need to be sent from the transmitting UE to receiving UE through layer-1 or layer-2 links (see 230 and 240 of FIG. 2 for layer-1 and layer-2), or can be derived based on the part of the information already sent to the RX UE. For example, based on the Priority information in the SCI and the sent CBR parameter, the maximum transmission number can be derived based on certain rule, such as a mapping table configured by the network or pre-configuration. Such layer-1 or layer-2 links, for example, may include SCI, MAC CE or Radio Resource Control (RRC) signaling (an RRC layer is part of layer-2 in the control plane, even though it is not explicitly shown in FIG. 2). Because these parameters need to be sent between the UEs, the structure of these signaling messages may need to be redesigned to accommodate these parameters. For example, the bit assignment in the SCI may be made to include bits that may be used to indicate the values of these parameters, such as the PDB and CBR that may be carried in the SCI. In another example, such information like PDB or CBR is carried in the MAC CE. Also because of such inter-UE communication needed in order for the receiving UE to determine the preemption priority of the TB and thus to efficiently carry out the preemption procedure, the HARQ process resource allocation may not always be left to a single UE. As such, the HARQ process resource allocation and the preemption procedure may require some amount of interoperability between UEs.

In some implementations, the pre-emption status Sj associated to a TB may include but are not limited to the following states:

No pre-emption, which means that the TB will not be included in the preemption procedure. In other words, a HARQ process associated with a TB having a no preemption state cannot be preempted by other TBs and does not preempt other TBs HARQ process for gaining a HARQ process, Preemption according to Pj, which means that the TB will be included in the preemption procedure, and will gain or lose the transmitting/retransmitting or receiving/re-receiving opportunity according to its Pj value in comparison with the Pj values of other TBs.

Abandoned, which means that the TB is to lose its association with any HARQ process and lose the transmitting/retransmitting or receiving/re-receiving opportunity, Granted, which means that the TB will always be associated with a HARQ process to gain the transmitting/retransmitting or receiving/re-receiving opportunity. For example, SRBs (Signaling Radio Bearer) or URLLC (Ultra-reliable low-latency communication)— like service data, may be allocated with the pre-emption status of granted, which means such kind of data can always be serviced with the highest priority. In case of all TBs in the preemption of are of "granted" status, other information likes the factors used for determining the preemption priority Pj in above list could be relied upon for preemption, or it could be left up to UE implementation.

These states may or may not be exclusive. For any TB that has not been associated with any HARQ process, its preemption status may be "preemption according to Pj" or "granted". For any TB that has been associated with a HARQ process, its preemption status may be "no preemption", "preemption according to Pj", "abandoned", or "granted".

With the more detailed description of the preemption status and preemption priority, the exemplary implementation of the HARQ process allocation and preemption procedure above may be further defined and described as the following. When the MAC entity determines that there is a new TB that requires transmitting or receiving, if there are available HARQ process, the new TB is allocated and associated with an available HARQ process to gain the transmitting or receiving opportunity. However, if no HARQ process is available, the new TB enters the HARQ process preemption procedure to compete with all other TBs that are of the status of "preemption according to Pj."

The preemption status Sj of a TB may be determined/affected by factors including but not limited to:

All TB that has been associated with a HARQ process may be further associated with a timer. The timer of a time period may be used to fully or partially determine the TB's preemption status. In particular, an expiration of the timer indicates that the TB has been associated with the HARQ process for the predetermined time period, and may trigger a change of the preemption status for the TB. For example, prior to the expiration of the timer, the preemption status Sj of the TB may be "no preemption", and after the timer expires, the preemption status Sj of the TB may be modified by the HARQ entity to "preemption according to Pj." In some other implementation, after the timer expires, the preemption status Sj of the TB may be modified to "abandoned" which leads to losing the transmitting/retransmitting or receiving/re-receiving opportunity directly.

The preemption status Sj of a TB may be modified according to an indication in the SCI. For example, the SCI may carry 1 or 2 bit information that indicates the preemption status Sj of the corresponding TB. In a particular example, the TB may be indicated by the SCI as having a "no pre-emption" status. In another example, the TB may be indicated by the SCI as having a "pre-emption according to Pj" or "abandoned" status.

The time period for the timer associated with the TB above may be predetermined or may be dynamically determined according parameters including but not limited to:

Priority information in the Sidelink control information (SCI).

a channel busy ratio (CBR) of a transmitting resource pool used by a transmitting UE associated with the TB;

a packet delay budget (PDB) associated with the TB;

a maximum retransmission number associated with the TB;

a ratio of the number of TBs that have already been transmitted by the first wireless user equipment compared to the maximum retransmission number allowed;

a time duration that the TB has been associated with an active HARQ process;

a number of code block groups (CBGs) that have been transmitted successfully for the TB;

a ratio of CBGs that have been transmitted successfully to a total number CBGs in the TB; or a resource reservation status (i.e., the number of successful reserved retransmission resource, or the time offset between current resource and the farthest reserved retransmission resource or both) indicated in the SCI which indicates the next or several next retransmission associated with the TB.

The time period of the timer may be derived or mapped from the parameter in above list, based on the configuration which includes the mapping rule or mapping table from the network or pre-configuration in the UE.

The time period value for the timer may be determined or derived from any one of the parameters above, or from any types of combination of any two or more parameters above. Again, some parameters above, such as the PDB and CBR information associated with the TB may need to be sent from the transmitting UE to receiving UE through layer-1 or layer-2 links. Such layer-1 or layer-2 links, for example, may include SCI, MAC CE or RRC signaling. Because these parameters need to be sent between the UEs, the structure of these signaling messages may need to be redesigned to accommodate these parameters. For example, the bit assignment in the SCI signaling message may be made to include bits that may indicate the values of these parameters. Also because of such inter-UE communication needed in order for the receiving UE to determine the timer value and thus the preemption status of the TB, the HARQ process resource allocation may not always be left to a single UE. The HARQ process resource allocation and the preemption procedure may require some amount of interoperability between UEs.

In above implementations, more detailed policy or configuration, including derivation of Pj/Sj based on the mapping rule which indicates how to map the concerned listed parameters to the value of Pj and Sj, dynamic modification of the Pj/Sj, specific preemption procedure between TBs may be from and specified in, for example, RRC messages, System Information Block (SIB) messages, or as pre-configuration. The policy or configuration may be based on different UE status. For example, for UE in the coverage of the network or if the UE is in an RRC_CONNECTED status, it could be configured by the RRC signaling. On the other hand, if the UE in an RRC_Idle or RRC_Inactive status, it could be configured by the SIB messages. Finally, if the UE is out of the coverage of the network, it may behave according to the pre-configuration.

The above HARQ resource allocation and preemption mechanism may be applied to a detailed exemplary implementation in a receiving UE (RX UE). Specifically, after the establishment of a unicast session or identifying the multicast (or groupcast)/broadcast service targeting the UE, the AS layer may be configured with a Layer-2 ID. Based on the Layer-2 ID, the corresponding Layer 1 ID may be derived by the receiving UE. Based on the Layer-1 ID, the corresponding SCI associated with the Layer-1 ID in the receiving resource pool may be monitored.

If the Layer-1 ID in the received SCI matches the Layer-1 ID corresponding to the unicast link or multicast/broadcast services the UE is interested in, and if there are available HARQ process, the corresponding SCI and the HARQ information may be stored into the HARQ entity. The TB may be received according to the resource information included in the SCI. The received TB may be stored into the HARQ buffer associated with the HARQ process.

When no receiving HARQ process is available, the MAC entity may carry out the preemption for the receiving HARQ process for the TB carried in the PSSCH indicated in the SCI. For example, all TBs having a preemption status of "pre-emption according to Pj" may take part in the pre-emption procedure. A HARQ process associated with a TB with higher Pj value (lower preemption priority) may be preempted and lose the receiving/re-receiving opportunity, while the TB associated with the newly received SCI may be allowed to preempt the low priority TB and allocated with the HARQ process released by the low priority TB. For example, for a HARQ entity with 10 receiving HARQ processes all being associated with TBs, there is no available HARQ process for receiving new TBs. SCI has been detected in one subframe, which may indicate that the TB associated with the SCI is of priority "4". In the preemption procedure, it is recognized that 8 of 10 TBs associated with the receiving HARQ process is of the preemption status of "pre-emption according to Pj", and with pre-emption priority of: "10, 2, 3, 4, 5, 10, 4, 4". Thus one of the HARQ process associated with TB of pre-emption priority of "10" will lose the receiving/re-receiving opportunity, and the service data in the corresponding HARQ process will be flushed. And the unassociated TB will be associated with the preempted HARQ process and gain its receiving opportunity. If the unassociated TB is of the least priority like 11, such TB will lose the receiving opportunity, and will be discarded and thus will not be associated with any HARQ process.

As the new TB is being received, its preemption status and priority may change. For example, the preemption status Sj of the TB may change when the timer associated with the TB expires, or when a status change is indicates in a SCI signaling associated with the TB. Specifically, the preemption status of the TB may change from "no pre-emption" to "pre-emption according to Pj", and may take part in future pre-emption procedures. For another example, the preemption status of the TB may change from "no pre-emption" to "abandoned", and thus may not take part in the future pre-emption procedure and lose the association with its HARQ process. For example, a TB associated with preemption status of "no pre-emption", at one moment, the received SCI associated with the TB indicates the intention of releasing the associated HARQ process, then the preemption status of the TB will change to "abandoned", and the buffer associated with the HARQ process will be flushed. The released HARQ process will be able to be associated with other TB.

For another example, the time period of the timer associated with the TB may be determined by the CBR of the resource pool of the transmitting UE Specifically, a higher CBR may result in a lower timer period. The timer associated with TB would expire sooner in this case, and the pre-emption status of the TB may change from "no pre-emption" to "abandoned" or "pre-emption according to Pj" as a result of the timer expiration. The TB thus would release the HARQ process sooner, providing more efficient utilization of the HARQ process resources. In another example, the time period of the timer associated with the TB may be determined by the resource reservation status of the TB. Specifically, if the resource reservation in the SCI associated with the TB indicates a scheduling of future re-transmission, the time period for the timer may be extended such that the re-transmission will not be missed due to timer expiration. For example, the resource reservation in the SCI may indicate the time offset between the current TB resource and the one of the farthest reserved resource, thus the timer can be extended to which to cover farthest reserved resource. For yet another example, the time period of the timer associated with the TB may be determined by the priority information in the SCI, or by the PDB value associated with the TB. Specifically, a higher priority in the SCI or a lower PDB may result in longer time period for the timer. The timer may be derived from one or the combination parameters, while the derivation rule may be configured by the network through a mapping rule or mapping table.

In some situations, the pre-emption status of the TB may be configured as "granted". For example, the TB may include service data of high priority or with stringent PDB requirement, such as an Ultra-Reliable Low-Latency Communication (URLLC) service, and thus may be configured as "granted". In some other situations, the TB may be associated with the grant from the network node in Mode 1 (wireless access network node allocates sidelink communication resources). Considering that the transmitting or receiving in Mode 1 is of higher priority than that in Mode 2, the TB may be given the "grant" status to always gain the opportunity of receiving. In case of there are multiple TB s with "granted" status and there are not enough HARQ process, the pre-emption priority Pj associated with the TBs may be used to determine which TB gain the receiving opportunity. The TB of granted status may be multiplexed from certain LCHs (logic channels) or QoS flows based on the configuration of the LCHs and QoS flows are configured by the network or based on the pre-configuration. The derivation rule of how to determine preemption status of a certain TB based on the LCH/QoS Flow it contains is configured by the network or based on the pre-configuration.

In some situations, the preemption priority Pj associated with the TB may be determined by the priority information in the associated SCI. For example, a higher priority in the SCI may result in a lower Pj value or higher preemption priority. For example, the SCI associated with the TB may indicate a priority of 3, which will result in a derived Pj of 3 according to the mapping rule or derivation method provided by the network or pre-configuration. In some other situations, the preemption priority Pj associated with the TB may change as the TB is being received. For example, as the TB is being received, the preemption priority Pj associated with the TB may reduce as the time period that the TB occupies the HARQ process grows, or the number of transmissions for the TB grows. In some situations, the preemption priority Pj associated with the TB may change according to the number or the ratio of successfully received CBGs in the TB. For example, as a ratio of the number of the successful CBGs compared to the all CBGs in the TB grow higher, the value of the pre-emption priority Pj associated with the TB may reduce resulting in higher preemption priority to increase the change that the entire TB will be successfully received. For example, the ratio of the number of the successful CBGs compared to all CBGs may be 50%, which will result in a higher preemption priority Pj of 5 compared to the original 10. The derivation method or a mapping rule or mapping table may be configured by the network or based on the pre-configuration. In some other situations, part of or the entirety of the above factors may be taken into consideration to determine the preemption priority of the receiving TB.

The above HARQ resource allocation and preemption mechanism may also be applied to a detailed exemplary implementation in a transmitting UE (TX UE). In this exemplary implementation, it is assumed that the transmitting UE operates in Mode 2 or Mode Co-existence (a transmitting UE share the HARQ process and other resources in the UE between Mode 1 and Mode 2 transmitting).

In this exemplary implementation, after the establishment of a unicast session or identifying a multicast/broadcast services targeting the other UEs), the AS layer of the transmitting UE may be configured with a Layer-2 ID. Based on the Layer 2 ID, the corresponding Layer-1 ID may be derived. Based on the Layer-1 ID, the service data may be transmitted on the sidelink resource grant in the transmitting resource pool.

When one or more transmitting HARQ processes are available, the transmission/retransmission of the TB may proceed after the TB is allocated and associated with an available HARQ process. The TB may be stored in the HARQ buffer associated with the HARQ process, and the HARQ process may be responsible for provisioning the transmission of the TB according to the sidelink resource grant.

However, when no transmitting HARQ process is available, at a time point after the sidelink resource grant is issued either from resource reservation in Mode 2 or from the network (e.g., the wireless access network node) in Mode 1, and before the sidle link resource time slots indicated in the sidelink resource grant, the MAC entity may carry out the preemption procedure for the transmitting TB. All TBs having the pre-emption status of "pre-emption according to Pj" may take part in the preemption procedure. In some implementations, a TB with a HARQ process association having an Pj of higher value (lower priority) may be preempted and lose its association with its current HARQ process and thus loose its transmitting/retransmitting opportunity, whereas the transmitting TB may be allocated with the released HARQ process for transmission/retransmission. For example, for a HARQ entity with 10 transmitting HARQ processes all being associated with TBs, there is no available HARQ process for transmitting new TBs. the unassociated TB associated with the SCI is of priority "4". In the preemption procedure, it is recognized that 8 of 10 TBs associated with the transmitting HARQ process are of the preemption status of "pre-emption according to Pj", and with pre-emption priority of: "10, 2, 3, 4, 5, 10, 4, 4". Thus one of the HARQ process associated with TB of pre-emption priority of "10" will lose the transmitting/re-transmitting opportunity, and the service data in the corresponding HARQ process will be flushed. The unassociated TB will be associated with the preempted HARQ process and gain its transmitting opportunity. If the unassociated TB is of the least priority, e.g., 11, such TB will lose the transmitting opportunity, and will be discarded and thus will not be associated with any HARQ process.

During the transmission and retransmission process for the transmitting TB, the preemption status Sj of the transmitting TB may change. For example, the preemption status Sj of the transmitting TB will may change when the timer associated with the TB expires. In some exemplary situations, the preemption status of the transmitting TB may change from "no pre-emption" to "pre-emption according to Pj", and may take part in future preemption procedures. In some other exemplary situations, the preemption status of the transmitting TB may change from "no pre-emption" to "abandoned", and may lose its transmission opportunity and may not take part in future preemption procedures. For example, a TB associated with preemption status of "pre-emption according to Pj" or "no pre-emption", at one moment, the expiring of the timer indicates the intention of releasing the associated HARQ process, then the preemption status of the TB will change to "abandoned", and the buffer associated with the HARQ process will be flushed. The released HARQ process will be able to be associated with other TBs for future transmission.

In some implementations, the time period value for the timer associated with the TB may be determined by the CBR of the resource pool of the transmitting UE. A higher CBR may result in a smaller timer period value and as such, the timer associated with the transmitting TB would expire sooner and the preemption status of the transmitting TB, for example, may change from "no pre-emption" to "abandoned" sooner. In some implementation, the timer associated with the transmitting TB may be determined by the resource reservation status of the transmitting TB. For example, when the resource reservation is successful for scheduling of the future retransmission, the timer associated with the transmitting TB may be extended such that the transmitting TB would not miss the chance of the schedule retransmission. For another example, when the resource reservation is unsuccessful for scheduling of the future retransmission of the transmitting TB and any further reservation would violate the PDB requirements of the TB, the time value of the timer associated with the transmitting TB may be reduced, thus allowing sooner release its HARQ process for more efficiently utilization of the HARQ process. In some other implementations, the time value of the timer associated with the transmitting TB may be determined by the priority associated with the transmitting TB (as may be determined according the characteristic of the QoS flows carried in the transmitting TB), or the PDB value associated with the TB. For example, a higher priority or a longer PDB will result in a longer time value for the timer. In some other implementations, the time value of the timer associated with the transmitting TB may be determined by the maximum number of transmission/retransmission associated with the transmitting TB. For example, a higher number of maximum transmission/retransmission may result in a longer time value for the timer. The timer may be derived from one or the combination parameters (together with the CBR, resource reservation status, etc.), while the derivation rule may be configured by the network through a mapping rule or mapping table.

In some exemplary situations, the preemption status of the transmitting TB may be configured as "granted". For example, transmitting TB may be configured as "granted" when it include service data of high priority or with stringent PDB value, such as URLLC service. For another example, when the transmitting TB is associated with sidelink resource grant from the network node in Mode 1, the preemption status of the transmitting TB may be set as "granted," considering that the transmitting in Mode 1 is of higher priority than Mode 2. In situations where there are multiple TB s with "granted" status and there are not enough HARQ processes available, the preemption priority Pj associated with these TBs may be used to determine which TB gain the transmitting opportunity.

In some exemplary situations, the preemption priority Pj associated with the transmitting TB may be determined by the priority associated with the TB (as may be determined according the characteristic of the QoS flows carried in the transmitting TB). For example, a higher priority may result in a lower Pj, indicating a higher preemption priority. As the transmitting TB is being transmitted/retransmitted, the pre-emption Pj associated with the transmitting TB may change. For example, as the transmitting TB is being transmitted/retransmitted, the preemption priority Pj associated with the transmitting TB may reduce as the time period that the transmitting TB occupies the HARQ process grows, or as the number of transmission/retransmission grows. In some exemplary situations, the preemption Pj associated with the transmitting TB may change according to the number or the ratio of successfully transmitted CBGs in the transmitting TB. For example, as the ratio of the number of the successfully CBGs compared to all CBGs in the transmitting TB grows, the value of the preemption priority Pj associated with the transmission TB may reduce, resulting in higher preemption priority to increase the chance that the entire transmitting TB may be successfully transmitted. The timer may be derived from one or the combination parameters (together with the CBR, resource reservation status, etc.), while the derivation rule may be configured by the network through a mapping rule or mapping table.

Further implementations and examples below relate to an enhanced mechanism for logic channel prioritization (LCP). The logic channels for example may be associated with the PDCP and RLC layer of FIG. 2.

In the LCP procedure, a TX UE may allocate grant of specific radio resources to the logic channels (LCH) of the TX UE and generate a TB. The TB may be associated with a property according to the grant or the service data in the LCH the TB contains. Each LCH may be uniquely associated to a radio bearer. The term "property" may be alternatively referred to as "indicator". For example, "reliability property" may be alternatively referred to as "reliability indicator".

In groupcast (or multicast), there are three possible HARQ feedback options. In option 1, the RX UE (receiving UE) only transmits Negative acknowledgement (NACK) feedback if it has failed to successfully receive the transmission and does nothing when the transmission is successful. In option 2, the RX UE transmits HARQ acknowledgement (ACK) if the transmission is successful, and transmits NACK if it fails to receive the transmission. In option 3, the UE does not transmit any feedback. Option 2 offers better transmission reliability compared to option 1 which might suffer from the discontinuous transmission (DTX) issue. The reliability of option 3 is the lowest compared to option 1 and option 2.

In some implementation, to better indicate different feedback reliability and achieve more efficient resource allocation in the LCP procedure, the LCH having the finest QoS granularity in the air interface may be associated with a reliability property.

In some implementations, the reliability property may directly comprise the various acknowledgement options stated above. The provided reliability for the three options increase in the order of option 3, option 1, and option 2.

Alternatively, the reliability property may be implemented as a numerical value. In some implementations, the reliability property value may be implemented as part of the configuration of the LCH/RB provided by a network node on the carrier network side. Each of the acknowledgement options above may be associated with a segment for this reliability value. Assuming that the reliability property is represented by a value from 0-1, two values, for example, 0.5 and 0.9, may be used to divide the value range of 0-1 into three segments, 0-0.5, 0.5-0.9, and 0.9-1, respectively corresponding to option 3, option 1, and option 2. The LCHs having certain reliability property value will be associated with a corresponding feedback option and will accordingly attend to the following LCP procedure. The segmenting rule or the mapping rule from the numerical value to the acknowledgement options is configured by the network or based on a pre-configuration.

In some implementations, the reliability property value as part of the configuration of the LCH/RB may be provided by the network node. For example, in NR V2X for UE of RRC_CONNECTED status or RRC_Idle/RRC_Inactive status, the sidelink radio bearer (SLRB) may be configured by the base station (gNB or eNB) though dedicated signaling or System Information Block (SIB) according to the QoS flows that are reported by the UE and that needs to be sent. In some other implementations, the reliability property value as part of the configuration of the LCH/RB may be provided based on a pre-configuration. For example, in UE in NR V2X having an out of coverage (OOC) status, the reliability property value of the LCH/RB may be derived based on the pre-configuration which may include mapping rules from the characteristics of the QoS flows that needs to be sent.

In some implementations, the reliability indicators of the LCHs may be updated by a network node of the wireless network through a dedicated signaling or a broadcast signaling, triggered by or after the update of the configured resource pool or updated group information. In some implementations, the reliability indicators of the LCHs may be updated as triggered by or after the update of the configured resource pool or updated group information following a mapping rule from the QoS flows to the RBs being received from the wireless network or by pre-configuration. For example, the update of the group information or the configuration may result in that option 2 cannot be realized, e.g., the configuration of the feedback resource won't allow each RX UE have independent feedback. Therefore, the reliability indicators of the LCHs may be updated according to which.

In a first type of LCP procedure, the grant of radio resource may be associated with the reliability property. In the first step of this LCP procedure for selection of LCHs, only LCHs that meet the reliability property associated with the grant may be considered in the following steps of the LCP procedure. For example, the grant may be associated with the reliability property of option 2, thus only LCHs with the reliability property of option 2 can be selected for the following steps of LCP procedure. In another example, the grant may be associated with the reliability property of option 2, thus only LCHs with the reliability property lower than or equal to feedback option 2, i.e., feedback option 2, feedback option 1 and feedback option 3 can be selected for the following steps of LCP procedure.

In the second step of the LCP procedure, a Destination may be selected. In particular, Destination having the sidelink logical channel with the highest priority, among the sidelink logical channels having data available for transmission, may be selected.

In the third step of the LCP procedure, radio resources are allocated. In particular, the LCHs selected in the first step and belonging to the Destination selected in the second step may be allocated corresponding radio resources based on the priority (where a higher priority value indicates a lower priority level), and/or the prioritisedBitRate (which sets the Prioritized Bit Rate (PBR)), and/or the bucketSizeDuration (which sets the Bucket Size Duration (BSD)) of the LCHs.

In some implementations, the generated TB after the LCP procedure will be associated with a reliability property which is the same as the one in the grant. For example, if the grant is of the reliability property of option 2, then the TB would be of the same reliability property of option 2. In some implementations, the MAC Layer may instruct the reliability property associated with the TB to PHY layer for inclusion in SCI.

In a second type of LCP procedure, the grant may not be associated with the reliability property. In the first step of the LCP procedure for selection of LCHs according to the grant, the reliability property may not be considered.

In the second step of the second type of LCP procedure for selection of Destination, Destination having the sidelink logical channel with the highest priority, among the sidelink logical channels having data available for transmission, may be selected.

In the third step of the second type of LCP procedure for selection of reliability property, the reliability property equal to, or lower than or equal to that of the selected LCHs of the highest priority from the second step of the LCP procedure, may be selected as the reliability property. For example, among the selected LCHs from the first step of LCP procedure, LCH1 may have the highest LCH priority, and the reliability property associated with LCH1 may be selected in the second step of the LCP procedure. In case that there are multiple LCHs with the same highest LCH priority, another LCH property such as packet delay budget (PDB) may be used as tie breaker, such that the LCH with lowest PDB may be selected. For example, the selected reliability property is of option 2, thus only LCHs with the reliability property of option 2 can be selected for the following steps of LCP procedure. In another example, the selected reliability property is of option 2=, thus only LCHs with the reliability property lower than or equal to feedback option 2, i.e., feedback option 2, feedback option 1 and feedback option 3 can be selected for the following steps of LCP procedure.

In the fourth step of the second type of LCP procedure, the LCHs that belong to the selected Destination in the second step and with the selected reliability property in the third step, will be allocated the corresponding resources based on the priority (where a higher priority value indicates a lower priority level), and/or the prioritisedBitRate (which sets the Prioritized Bit Rate (PBR)); and/or the bucketSizeDuration (which sets the Bucket Size Duration (BSD)) of the LCHs.

In some implementations, the generated TB after the second type of LCP procedure may be associated with a reliability property which is the same as the one selected in the third step. For example, when the selected reliability property in the third step is of option 2, the TB may be of the same reliability property of option 2. In some implementations, the MAC Layer may instruct the reliability property associated with the TB to the PHY layer for inclusion in SCI.

In a third type of LCP procedure, the grant may not be associated with the reliability property. In the first step of the LCP procedure for selection of LCHs, the reliability property may not be considered.

In the second step of the third type of LCP procedure for selection of Destination, Destination having the sidelink logical channel with the highest priority, among the sidelink logical channels having data available for transmission, may be selected.

In the third step of the third type of LCP procedure, radio resources are allocated. In particular, the LCHs selected in the first step will be allocated the corresponding resources based on the priority (where a higher priority value indicates a lower priority level), and/or the prioritisedBitRate (which sets the Prioritized Bit Rate (PBR)), and/or the bucketSizeDuration (which sets the Bucket Size Duration (BSD)).

In some implementation, the generated TB after the third type of LCP procedure may be associated with a reliability property based on the reliability property associated with the LCHs the TB contains. For example, the reliability property of a TB may be the highest level of reliability among all LCHs contained in the TB. For example, a TB may contain service data from LCH1, LCH2 and LCH3, with reliability property of option 2, option 1, and option 1. Thus the reliability property of this TB may be option 2. In some implementation, the MAC Layer may instruct the reliability property associated with the TB to PHY layer for inclusion in SCI.

Finally, in cellular wireless communication systems, there are at least two possible transmission feedback schemes, namely HARQ feedback enabled and HARQ feedback disabled. If HARQ feedback is enabled, the TX UE will retransmit based on the HARQ feedback from the RX UE. If HARQ feedback is disabled, TX UE will retransmit not based on the HARQ feedback from the RX UE.

In some implementation, to better indicate different QoS and achieve more efficient resource allocation in the LCP procedure, the LCH having the finest QoS granularity in the air interface may be associated with a HARQ feedback property, which may be either HARQ feedback enabled or HARQ feedback disabled.

In some implementation the HARQ feedback property may be part of the configuration of the LCH/RB by the network node. For example, in NR V2X for UE of RRC_CONNECTED status or RRC_Idle/RRC_Inactive status, the sidelink radio bearer (SLRB) may be configured by the base station (gNB or eNB) though dedicated signaling or System Information Block (SIB) according to the QoS flows that are reported by the UE and that needs to be sent. In some other implementations, the HARQ feedback property as part of the configuration of the LCH/RB may be provided based on a pre-configuration. For example, in UE in NR V2X having an out of coverage (OOC) status, the HARQ feedback property of the LCH/RB may be derived based on the pre-configuration which may include mapping rules from the characteristics of the QoS flows that needs to be sent.

In a first type of LCP procedure, the grant of the radio resource may be associated with the HARQ feedback property. In the first step of this LCP procedure for selection of LCHs, only LCHs that match the HARQ feedback property associated with the grant may be considered in the following steps of the LCP procedure. For example, the grant may be associated with the HARQ feedback property of HARQ feedback enabled, thus only LCHs with the HARQ feedback property of HARQ feedback enabled can be selected for the following steps of LCP procedure.

In the second step of the LCP procedure, Destination may be selected, In particular, Destination having the sidelink logical channel with the highest priority, among the sidelink logical channels having data available for transmission, may be selected.

In the third step of the LCP procedure, radio resources are allocated. In particular, the LCHs selected in the first step and belong to the Destination selected in the second step may be allocated corresponding radio resources based on the priority (where a higher priority value indicates a lower priority level), and/or the prioritisedBitRate (which sets the Prioritized Bit Rate (PBR)), and/or the bucketSizeDuration (which sets the Bucket Size Duration (BSD)) of the LCHs.

In some implementation, the generated transport TB after the LCP procedure will be associated with a HARQ feedback property which is the same as the one in the grant. For example, if the grant is of the HARQ feedback property of HARQ feedback enabled, then the TB would be of the same HARQ feedback property of HARQ feedback enabled. In some implementations, the MAC Layer may instruct the HARQ feedback property associated with the TB to PHY layer for inclusion in SCI.

In a second type of LCP procedure, the grant may not associated with the HARQ feedback property. In the first step of the LCP procedure for selection of LCHs according to the grant, the HARQ feedback property may not be considered.

In the second step of the second type of LCP procedure for selection of Destination, Destination having the sidelink logical channel with the highest priority, among the sidelink logical channels having data available for transmission, may be selected.

In the third step of the second type of LCP procedure for selection of HARQ feedback property, the HARQ feedback property equal to that of the selected LCHs of the highest priority from the second step of the LCP procedure, may be selected as the HARQ feedback property. For example, among the selected LCHs from the first step of LCP procedure, LCH1 may have the highest LCH priority, and the HARQ feedback property associated with LCH1 may be selected in the second step of the LCP procedure. In case that there are multiple LCHs with the same highest LCH priority, another LCH property such as packet delay budget (PDB) or reliability may be used as a tie breaker, such that the LCH with lowest PDB or higher reliability may be selected. For example, the selected HARQ feedback property is of HARQ feedback disabled, thus only LCHs with the HARQ feedback property of HARQ feedback disabled can be selected for the following steps of LCP procedure.

In the fourth step of the second type of LCP procedure, the LCHs that belong to the selected Destination in the second step and own the selected HARQ feedback property in the third step, will be allocated the corresponding resources based on the priority (where a higher priority value indicates a lower priority level), and/or the prioritisedBitRate (which sets the Prioritized Bit Rate (PBR)), and/or the bucketSizeDuration (which sets the Bucket Size Duration (BSD)) of the LCHs.

In some implementation, the generated TB after the second type of LCP procedure may be associated with a HARQ feedback property which is the same as the one selected in the third step. For example, when the selected HARQ feedback property in the third step is of HARQ feedback enabled, the TB may be of the same HARQ feedback property of HARQ feedback enabled. In some implementation, the MAC Layer may instruct the HARQ feedback property associated with the TB to the PHY layer for inclusion in SCI.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for resource allocation for groupcast in a wireless network, comprising:
    mapping quality of service (QOS) flows to a plurality of logic channels (LCHs)/radio bearers (RBs), wherein the LCHs/RBs are associated with corresponding first reliability indicators and wherein each of the first reliability indicators comprises one of feedback disabled, feedback negative acknowledgement (NACK) only, and feedback with both acknowledgement (ACK) and NACK in ascending reliability order;
    performing a logic channel prioritization (LCP) procedure based on the first reliability indicators;
    generating transport blocks (TBs) from the LCP procedure; and deriving second reliability indicators each for one of the TBs.

2. The method of claim 1, wherein:
the first reliability indicators of the LCHs are configured by a network node of the wireless network through a dedicated signaling or a broadcast signaling; and
a mapping rule from the QoS flows to the RBs is received from the wireless network or by pre-configuration.

3. The method of claim 2, wherein:
the first reliability indicators of the LCHs are updated by a network node of the wireless network through the dedicated signaling or the broadcast signaling, triggered by or after an update of a configured resource pool or updated group information; and
the first reliability indicators of the LCHs are updated as triggered by or after the update of the configured resource pool or updated group information following a mapping rule from the QoS flows to the RBs being received from the wireless network or by pre-configuration.

4. The method of claim 1, wherein the LCP procedure comprises:
identifying one or more LCHs having respective first reliability indicators that are compatible with a third reliability indicator in a resource grant;
determining a destination for an LCH having a highest priority among the one or more LCHs identified in the identifying step; and
allocating the resource grant to a group of LCHs among the one or more LCHs identified in the identifying step targeting the destination determined in the determining step.

5. The method of claim 4, wherein:
the TBs generated after the LCP procedure are associated with the second reliability indicators which are the same as the third reliability indicator in the resource grant; and
a media access control (MAC) Layer is configured to instruct the second reliability indicators associated with the TBs to a PHY layer for inclusion in a sidelink control information (SCI).

6. The method of claim 1, wherein the LCP procedure comprises,
selecting one or more LCHs among the plurality of LCHs based on properties of a resource grant other than its reliability indicator;
determining a destination for an LCH having a highest priority among the one or more LCHs identified in the selecting step;
identifying a range of reliability indicator equal to, or lower than or equal to that of the LCH having the highest priority; and
allocating the resource grant to a group of LCHs among the one or more LCHs selected in the selecting step, targeting the destination determined in the determining step, and having reliability indicator within the range of reliability indicator identified in the identifying step.

7. The method of claim 6, wherein:
the TBs generated after the LCP procedure are associated with third reliability indicators within the same range as the one in the identifying step of claim 6; and
a MAC Layer is configured to instruct the third reliability indicators associated with the TBs to a PHY layer for inclusion in sidelink control information (SCI).

8. The method of claim 1, wherein the LCP procedure comprises:

selecting one or more LCHs among the plurality of LCHs based on properties of a resource grant other than its reliability indicator;
determining a destination for an LCH having a highest priority among the one or more LCHs identified in the selecting step; and
allocating the resource grant to a group of LCHs among the one or more LCHs selected in the selecting step and targeting the destination determined in the determining step.

9. The method of claim 8, wherein:
the TBs generated after the LCP procedure are associated with second reliability indicators derived based on the first reliability indicators associated with the LCHs; and
a MAC Layer is configured to instruct the second reliability indicators associated with the TB to a PHY layer for inclusion in sidelink control information (SCI).

10. The method of claim 9, wherein the TBs generated after the LCP procedure are associated with highest reliability indicator among the first reliability indicators associated with the LCHs.

11. A method for resource allocation for groupcast in a wireless network, comprising:
mapping quality of service (QOS) flow to a plurality of logic channel (LCHs)/radio bearers (RBs), wherein the LCHs/RBs are associated with a first hybrid automatic repeat request (HARQ) feedback indicator comprising one of HARQ feedback enabled and HARQ feedback disabled;
performing a logic channel prioritization (LCP) procedure based on the first HARQ feedback indicators;
generating transport blocks (TBs) from the LCP procedure; and
determining second HARQ feedback indicators each for one of the TBs.

12. The method of claim 11, wherein:
the first HARQ feedback indicators of the LCHs are configured by a network node through dedicated signaling or system information block; and
a mapping rule from the QoS flows to the RBs is received from the wireless network or by pre-configuration.

13. The method of claim 11, wherein the LCP procedure comprises:
identifying one or more LCHs having respective first HARQ feedback indicators that are compatible with a third HARQ feedback indicator in a resource grant;
determining a destination for an LCH having a highest priority among the one or more LCHs identified in the identifying step; and
allocating the resource grant to a group of LCHs among the one or more LCHs identified in the identifying step targeting the destination determined in the determining step.

14. The method of claim 13, wherein:
the TBs generated after the LCP procedure are associated with the second HARQ feedback indicators which are the same as the third HARQ feedback indicator in the resource grant; and
a media access control (MAC) Layer is configured to instruct the second HARQ feedback indicators associated with the TBs to a PHY layer for inclusion in a sidelink control information (SCI).

15. The method of claim 11, wherein the LCP procedure comprises,
selecting one or more LCHs among the plurality of LCHs based on properties of a resource grant other than its HARQ feedback indicator;

determining a destination for an LCH having a highest priority among the one or more LCHs identified in the selecting step;

identifying a range of HARQ feedback indicator equal to, or lower than or equal to that of the LCH having the highest priority; and allocating the resource grant to a group of LCHs among the one or more LCHs selected in the selecting step, targeting the destination determined in the determining step, and having HARQ feedback indicator within the range of HARQ feedback indicator identified in the identifying step.

16. The method of claim 15, wherein:

the TBs generated after the LCP procedure are associated with third HARQ feedback indicators within the same range as the one in the identifying step of claim 14; and a media access control (MAC) Layer is configured to instruct the third HARQ feedback indicators associated with the TBs to a PHY layer for inclusion in SCI.

17. A wireless user equipment comprising one or more processors and one or more memories, wherein the one or more processors are configured to read computer code from the one or more memories to:

map quality of service (QOS) flows to a plurality of logic channels (LCHs)/radio bearers (RBs), wherein the LCHs/RBs are associated with corresponding first reliability indicators and wherein each of the first reliability indicators comprises one of feedback disabled, feedback negative acknowledgement (NACK) only, and feedback with both acknowledgement (ACK) and NACK in ascending reliability order;

perform a logic channel prioritization (LCP) procedure based on the first reliability indicators;

generate transport blocks (TBs) from the LCP procedure; and derive second reliability indicators each for one of the TBs.

18. A computer program product comprising a non-transitory computer-readable program medium with computer code stored thereupon, the computer code, when executed by one or more processors, causing the one or more processors to implement the method of claim 1.

19. A wireless user equipment comprising one or more processors and one or more memories, wherein the one or more processors are configured to read computer code from the one or more memories to implement the method of claim 11.

20. A computer program product comprising a non-transitory computer-readable program medium with computer code stored thereupon, the computer code, when executed by one or more processors, causing the one or more processors to implement the method of claim 11.

* * * * *